US009600006B2

(12) United States Patent

Kurozo et al.

(10) Patent No.: US 9,600,006 B2

(45) Date of Patent: Mar. 21, 2017

(54) SHORT ACTIVATION TIME VOLTAGE REGULATOR

(71) Applicant: Seiko Instruments Inc., Chiba-shi, Chiba (JP)

(72) Inventors: Tadashi Kurozo, Chiba (JP); Takao Nakashimo, Chiba (JP); Michiyasu Deguchi, Chiba (JP)

(73) Assignee: SEIKO INSTRUMENTS INC., Chiba (JP)

(*) Notice: Subject to any disclaimer, the term of this patent is extended or adjusted under 35 U.S.C. 154(b) by 0 days.

(21) Appl. No.: 15/000,683

(22) Filed: Jan. 19, 2016

(65) Prior Publication Data

US 2016/0211751 A1 Jul. 21, 2016

(30) Foreign Application Priority Data

Jan. 21, 2015 (JP) ................................ 2015-009614

(51) Int. Cl.

| | |
|---|---|
| ***G05F 1/569*** | (2006.01) |
| ***G05F 1/571*** | (2006.01) |
| ***G05F 1/00*** | (2006.01) |
| ***H02H 7/00*** | (2006.01) |
| ***H02H 9/00*** | (2006.01) |
| ***G05F 1/573*** | (2006.01) |

(52) U.S. Cl.

CPC .............. *G05F 1/569* (2013.01); *G05F 1/573* (2013.01)

(58) Field of Classification Search

CPC . G05F 1/461; G05F 1/56; G05F 1/562; G05F 1/569; G05F 1/571; G05F 1/573; G05F 1/575; H02M 1/32

USPC ... 323/268, 274, 276, 277, 284, 285; 361/18

See application file for complete search history.

(56) References Cited

U.S. PATENT DOCUMENTS

| | | | | | |
|---|---|---|---|---|---|
| 7,710,090 | B1 * | 5/2010 | Kimura | G05F 1/5735 | 323/276 |
| 2008/0224680 | A1 * | 9/2008 | Suzuki | G05F 1/56 | 323/284 |
| 2008/0278868 | A1 * | 11/2008 | Morino | G05F 1/573 | 361/18 |
| 2009/0273323 | A1 * | 11/2009 | Kimura | G05F 1/56 | 323/265 |

(Continued)

FOREIGN PATENT DOCUMENTS

JP 2011-242945 A 12/2011

*Primary Examiner* — Adolf Berhane

*Assistant Examiner* — Gary Nash

(74) *Attorney, Agent, or Firm* — Brinks Gilson & Lione

(57) ABSTRACT

Provided is a voltage regulator having a simple circuit configuration in which a protection circuit is not erroneously operated, and delay time of activation of the protection circuit is short. The voltage regulator includes: a protection circuit configured to control an output transistor when an abnormality of the voltage regulator is detected; a first constant current circuit configured to supply operating current to the protection circuit; and a detection circuit configured to detect output current flowing through the output transistor, to thereby control the first constant current circuit. The detection circuit is further configured to detect the output current with a predetermined reference current value. The protection circuit is further configured to control the output transistor so that the output current does not fall below the reference current value.

4 Claims, 5 Drawing Sheets

(56) References Cited

U.S. PATENT DOCUMENTS

| | | | | |
|---|---|---|---|---|
| 2012/0286751 A1* | 11/2012 | Sakaguchi | .............. | G05F 1/573 323/282 |
| 2013/0069607 A1* | 3/2013 | Suzuki | .................... | G05F 1/575 323/271 |
| 2013/0154601 A1* | 6/2013 | Snowdon | ................ | G05F 1/571 323/311 |
| 2013/0234687 A1* | 9/2013 | Fujimura | ................ | G05F 1/575 323/282 |
| 2013/0293986 A1* | 11/2013 | Lerner | .................... | G05F 1/573 361/18 |

* cited by examiner

SHORT ACTIVATION TIME VOLTAGE REGULATOR

RELATED APPLICATIONS

This application claims priority under 35 U.S.C. §119 to Japanese Patent Application No. 2015-009614 filed on Jan. 21, 2015, the entire content of which is hereby incorporated by reference.

BACKGROUND OF THE INVENTION

1. Field of the Invention

The present invention relates to a voltage regulator, and more specifically, to a protection circuit with low current consumption whose operation is stopped in the case of light load.

2. Description of the Related Art

FIG. 5 is a circuit diagram for illustrating a related-art voltage regulator including a protection circuit.

The related-art voltage regulator includes a reference voltage circuit 101, an error amplifier 102, a PMOS transistor 106, resistors 107 and 108, a PMOS transistor 104, a constant current circuit 105, a resistor 111, a capacitor 112, a protection circuit 103, a constant current circuit 113 for the protection circuit 103, a VDD terminal 109, a VSS terminal 100, and an output terminal 110.

The PMOS transistor 104 and the constant current circuit 105 form an output current detection circuit configured to detect output current. When a heavy load is connected to the output terminal 110 and output current is thus large, the output current detection circuit outputs a detection signal. When the detection signal is output, constant current is caused to flow through the constant current circuit 113 to turn on the protection circuit 103. Then, the protection circuit 103 outputs a predetermined signal corresponding to the detection signal. When a light load is connected to the output terminal 110 and the output current is thus small, the output current detection circuit prevents the current from flowing through the constant current circuit 113 to turn off the protection circuit 103. Consequently, the voltage regulator consumes a small amount of current in the case of light load.

The resistor 111 and the capacitor 112 form a low-pass filter and prevent the protection circuit 103 from being erroneously operated when fluctuation in power supply voltage is large.

In the related-art voltage regulator including the protection circuit, in the case of light load, the current is prevented from flowing through the constant current circuit 113 to stop the operation of the protection circuit 103, and hence there is a problem in that the protection circuit 103 is repeatedly controlled to be on and off. The control of turning off the protection circuit 103 in the case of light load can be delayed with the low-pass filter of the resistor 111 and the capacitor 112. Thus, the above-mentioned repetitive operation can be avoided by changing, while the control is being delayed, the logic of an output of the protection circuit 103 to a logic that cancels an OFF state of the PMOS transistor 106.

However, when a load is suddenly changed from a light load to a heavy load and the operation of the protection circuit 103 thus needs to be started quickly, delay time due to the low-pass filter is further increased by a period of time required for starting activation of the constant current circuit 113. Consequently, when a load is suddenly changed from a light load to a heavy load, the start of the operation of the protection circuit 103 is delayed by the activation time of the constant current circuit 113.

The related-art voltage regulator including the protection circuit that only uses the low-pass filter has trade-off between solving the problem and the delay in start of the operation of the protection circuit 103, and hence no fundamental solution has been provided.

SUMMARY OF THE INVENTION

The present invention has been made in view of the above-mentioned problem, and provides a voltage regulator having a simple circuit configuration in which a protection circuit is not erroneously operated, and delay time of activation of the protection circuit is short.

In order to solve the related-art problem, a voltage regulator according to one embodiment of the present invention has the following configuration.

The voltage regulator includes: a protection circuit configured to control an output transistor when an abnormality of the voltage regulator is detected; a first constant current circuit configured to supply operating current to the protection circuit; and a detection circuit configured to detect output current flowing through the output transistor, to thereby control the first constant current circuit. The detection circuit is further configured to detect the output current with a predetermined reference current value. The protection circuit is further configured to control the output transistor so that the output current does not fall below the reference current value.

In the voltage regulator according to the one embodiment of the present invention, the output current flowing through the output transistor may be adjusted so as not to be the detection current or smaller when a heavy load is detected, and hence the protection circuit is not erroneously operated, and a time period required for activating the protection circuit may be shortened.

DETAILED DESCRIPTION OF THE PREFERRED EMBODIMENTS

Figure 1:
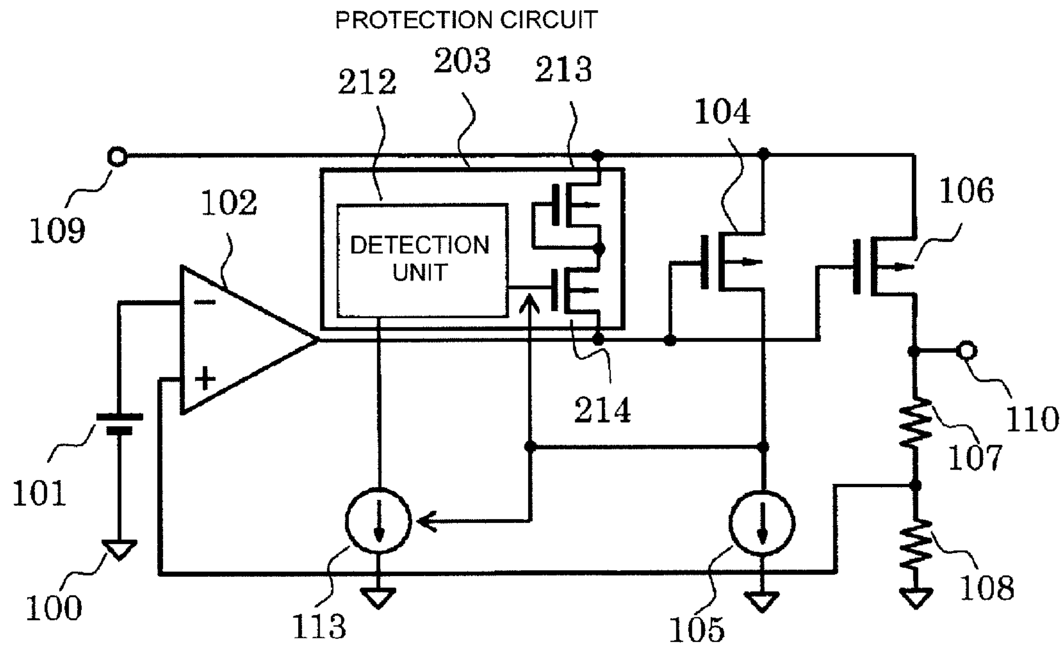
FIG. 1 is a circuit diagram of a voltage regulator according to an embodiment of the present invention.

FIG. 1 is a circuit diagram of a voltage regulator according to an embodiment of the present invention. In the voltage regulator of this embodiment, in order to avoid the erroneous operation of the repetitive operation of the protection circuit 103 that may occur in the case of light load and the operation of the protection circuit 103 is thus stopped, a protection circuit 203 controls the PMOS transistor 106 so that output current is suppressed to be a small value that does not fall below a threshold of output current detection performed by the PMOS transistor 104 and the constant current circuit 105.

The voltage regulator of this embodiment includes a reference voltage circuit 101, an error amplifier 102, an output transistor 106, divided resistors 107 and 108, the protection circuit 203, a first constant current circuit 113, a PMOS transistor 104, and a second constant current circuit 105. The protection circuit 203 includes a detection unit 212, and a PMOS transistor 213 and a PMOS transistor 214 forming an output unit.

The output transistor 106 has a drain connected to an output terminal 110, a source connected to a VDD terminal 109, and a gate connected to an output of the error amplifier 102. The divided resistors 107 and 108 are connected in series between the output terminal 110 and a VSS terminal 100. The error amplifier 102 has a non-inverting input terminal connected to a node between the resistor 107 and the resistor 108, and an inverting input terminal connected to an output of the reference voltage circuit 101. The PMOS transistor 104 has a drain connected to one end of the second constant current circuit 105, a source connected to the VDD terminal 109, and a gate connected to the output of the error amplifier 102. The other end of the second constant current circuit 105 is connected to the VSS terminal 100. The protection circuit 203 and the first constant current circuit 113 are connected in series between the VDD terminal 109 and the VSS terminal 100. An output of the protection circuit 203 is connected to the gate of the output transistor 106.

The detection unit 212 has an output terminal connected to a gate of the PMOS transistor 214. The PMOS transistor 213 has a source connected to the VDD terminal 109, and a gate and a drain connected to a source of the PMOS transistor 214. The PMOS transistor 214 has a drain connected to the output of the error amplifier 102.

The function of the protection circuit 203 is, for example, overcurrent protection, inrush current limitation, overheat protection, and the like. When the overcurrent protection is performed, the detection unit 212 detects an output current Iout flowing through the output transistor 106. When the inrush current limitation is performed, the detection unit 212 detects the rise of a power supply voltage of the VDD terminal 109. When the overheat protection is performed, the detection unit 212 detects heat generated due to a loss at the output transistor 106.

Next, the operation of the voltage regulator of this embodiment is described.

A reference voltage Vref output from the reference voltage circuit 101 and a feedback voltage Vfb obtained by dividing an output voltage of the output terminal 110 by the divided resistors 107 and 108 are input to the error amplifier 102. The error amplifier 102 amplifies an error of the input and controls the gate of the output transistor 106 with a voltage of the amplified error, to thereby make an output voltage Vout constant. The first constant current circuit 113 causes operating current to flow through the protection circuit 203. The PMOS transistor 104 copies the output current Iout flowing through the output transistor 106 and causes a current Isens to flow. The second constant current circuit 105 causes a current Iref to flow. The PMOS transistor 104 and the second constant current circuit 105 form an output current detection circuit configured to detect the output current Iout. The overcurrent detection circuit compares the current Isens and the current Iref, and outputs an overcurrent detection signal when the output current Iout is large with respect to a predetermined current. When receiving the overcurrent detection signal, the first constant current circuit 113 causes current to flow to operate the protection circuit 203, whereas when receiving no overcurrent detection signal, the first constant current circuit 113 prevents current from flowing to stop the protection circuit 203. When the protection circuit 203 is stopped, the protection circuit 203 outputs high impedance so as to allow the output transistor 106 to be operated.

In this case, a detection current Iact is a current serving as a reference for the detection performed by the PMOS transistor 104 and the second constant current circuit 105, and is expressed by the following expression.

$$Iact = Iout/Isens \times Iref$$

The protection circuit 203 controls the output transistor 106 so that a state in which the overcurrent detection circuit detects overcurrent is maintained. Specifically, the protection circuit 203 controls the output transistor 106 so that, while Iout>Iact is satisfied, the output current Iout is reduced as close to the detection current Iact as possible. Further, the detection current Iact is sufficiently reduced so as not to adversely affect the protection function of the protection circuit 203. For example, when the overcurrent protection or the inrush current limitation is performed, the detection current Iact is reduced so as to be sufficiently small with respect to current to be originally limited. Further, when the overheat protection is performed, the detection current Iact is reduced so that internal heat generation is suppressed to be about a few degrees Celsius even when the detection current Iact flows.

Next, there is described a method of controlling the output current Iout so as not to fall below the detection current Iact when the protection circuit 203 controls the output transistor 106.

The PMOS transistor 213 and the PMOS transistor 214 are connected in series between the VDD terminal 109 and the gate of the output transistor 106. The order of the series connection of the example illustrated in FIG. 1 may be reversed. The PMOS transistor 214 is connected to the gate of the output transistor 106 to increase a voltage of the node. A gate-source voltage of the output transistor 106 remains by a drain-source voltage of the PMOS transistor 213. With this, the output current flowing through the output transistor 106 can be adjusted so as not to be the detection current Iact or smaller.

As described above, according to the voltage regulator of this embodiment, the output current flowing through the output transistor 106 can be adjusted so as not to be the detection current Iact or smaller when a heavy load is detected, and hence no low-pass filter is needed for a circuit configured to control the protection circuit 203 to be operated and stopped. Consequently, the speed of a detection response to a change of the output current from a current for a light load to a current for a heavy load is increased.

Figure 2:
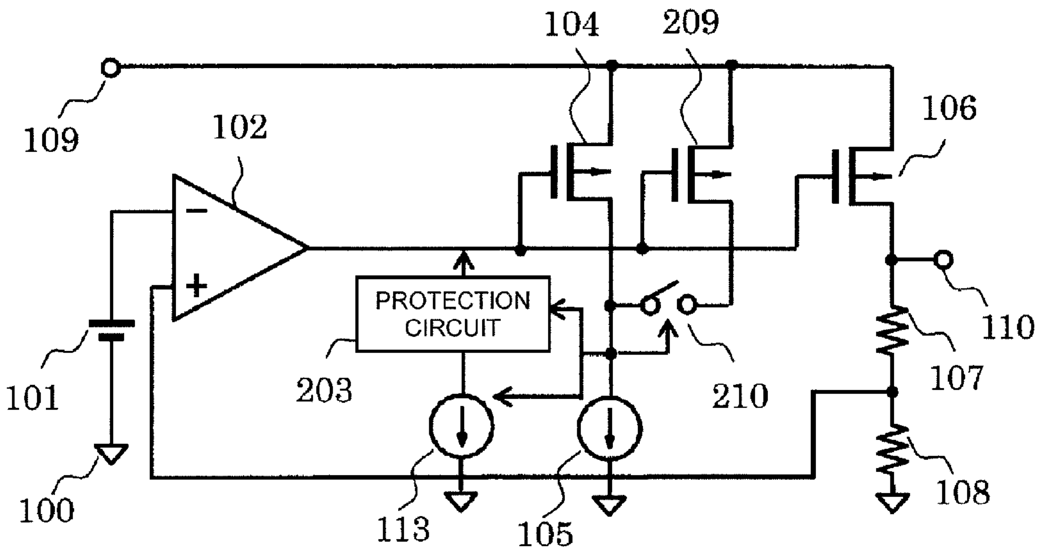
FIG. 2 is a circuit diagram for illustrating another example of the voltage regulator of this embodiment.

FIG. 2 is a circuit diagram for illustrating another example of the voltage regulator of this embodiment.

In the voltage regulator of FIG. 2, a threshold for the detection of the output current Iout has hysteresis. Thus, the threshold when the output current is changed from a large value to a small value is further reduced, to thereby enable the protection circuit 203 to suppress the output current flowing through the PMOS transistor 104 to be smaller.

The voltage regulator of FIG. 2 additionally includes a PMOS transistor 209 connected in parallel to the PMOS transistor 104, and a switch 210 connected between the drain of the PMOS transistor 104 and a drain of the PMOS transistor 209. The switch 210 is turned off when the output current Iout is small, and is turned on when it is detected that the output current Iout is increased to be large. Then, the switch 210 is turned off when it is detected that the output current Iout is reduced to be small.

When current flowing through the PMOS transistor 209 is represented by Isens2, detection currents Iact1 and Iact2 are expressed by the following expressions, respectively. The detection current Iact1 flows when the switch 210 is turned on, and the detection current Iact2 flows when the switch 210 is turned off.

$$Iact1=Iout/(Isens+Isens2)\times Iref$$

$$Iact2=Iout/Isens\times Iref$$

When the output current Iout is small, the output current Iout is detected with the detection current Iact2. When the output current Iout is increased to be larger than the detection current Iact2, the switch 210 is turned on. Thus, when the output current Iout is large, the output current Iout is detected with the detection current Iact1. In other words, the threshold for the detection of the output current Iout has hysteresis so that the detection current Iact1 can be set to be small. With this configuration, when the protection circuit 203 reduces the current flowing through the output transistor 106 to the detection current Iact, the protection circuit 203 is not stopped unless a load is changed to a lighter load. Thus, the erroneous operation of the repetitive operation described above can be prevented with higher reliability.

Figure 3:
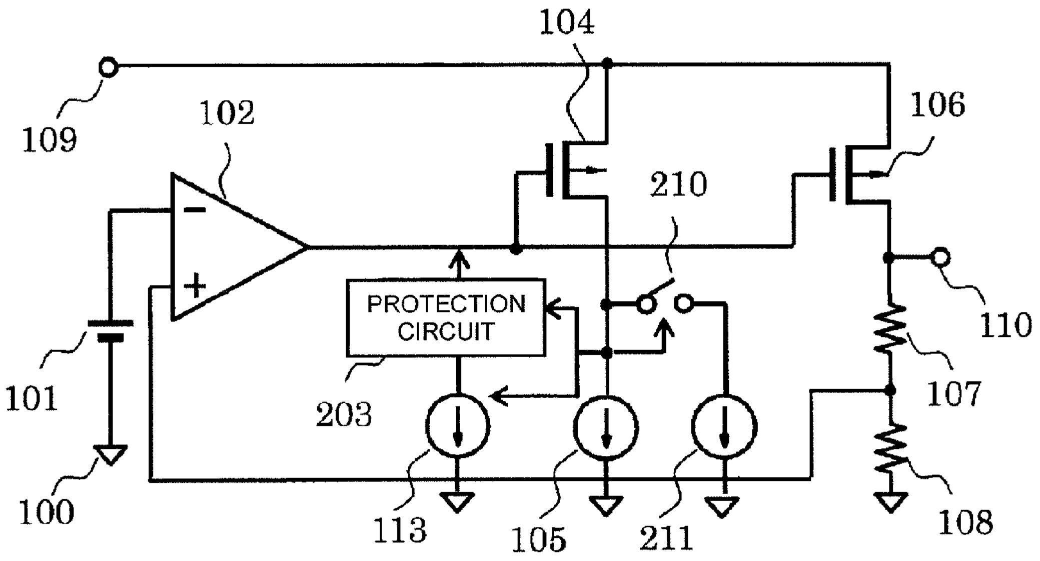
FIG. 3 is a circuit diagram for illustrating still another example of the voltage regulator of this embodiment.

FIG. 3 is a circuit diagram for illustrating still another example of the voltage regulator of this embodiment.

The voltage regulator of FIG. 3 is another configuration example in which the threshold for the detection of the output current Iout has hysteresis. Also with this configuration, a similar effect as that of the voltage regulator of FIG. 2 can be obtained.

Figure 4:
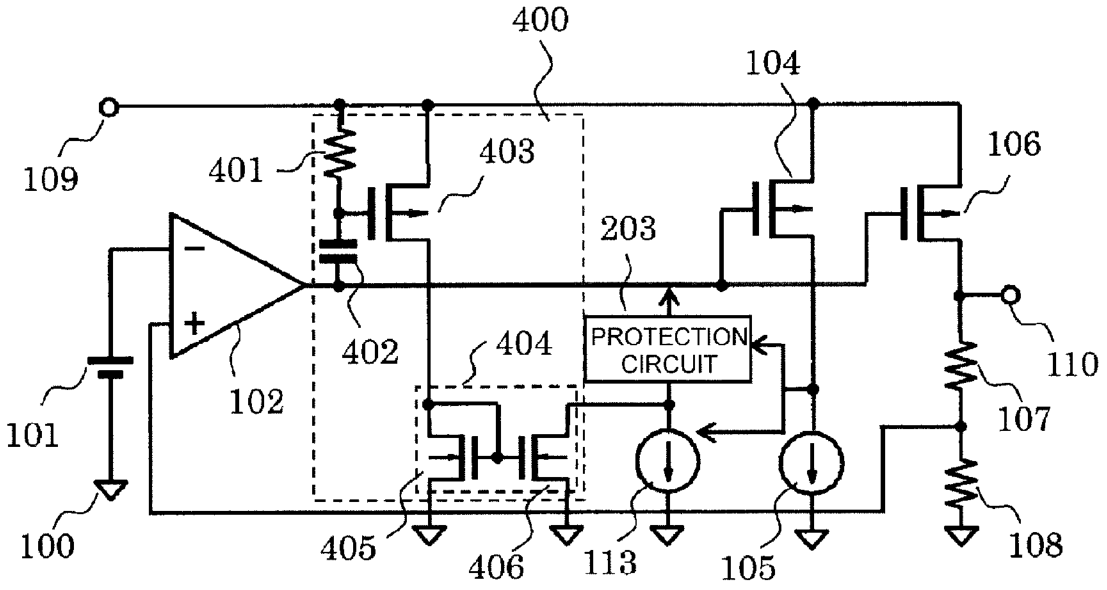
FIG. 4 is a circuit diagram for illustrating yet another example of the voltage regulator of this embodiment.
Figure 5:
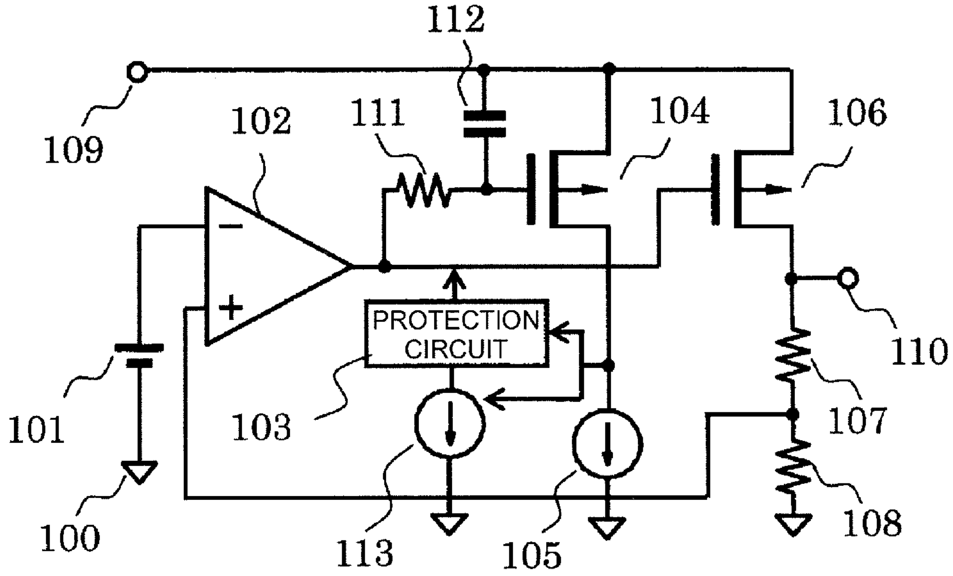
FIG. 5 PRIOR ART
FIG. 5 is a circuit diagram of a related-art voltage regulator.

FIG. 4 is a circuit diagram for illustrating yet another example of the voltage regulator of this embodiment.

In the voltage regulator of FIG. 4, the output current Iout is detected at a moment at which the output current Iout is changed from a current for a light load to a current for a heavy load, and a current of a constant current source 113 for operating the protection circuit 203 is temporarily increased, to thereby increase the operation speed of the protection circuit 203 after the detection.

The voltage regulator of FIG. 4 further includes a boost circuit 400. The boost circuit 400 includes a PMOS transistor 403, NMOS transistors 405 and 406 forming a current mirror circuit 404, and a resistor 401 and a capacitor 402 forming a high-pass filter.

The resistor 401 has one end connected to the VDD terminal 109, and the other end connected to one end of the capacitor 402. The capacitor 402 has the other end connected to the output of the error amplifier 102. The PMOS transistor 403 has a source connected to the VDD terminal 109, and a gate connected to a node between the resistor 401 and the capacitor 402, the node serving as an output terminal of the high-pass filter. The NMOS transistor 405 has a drain and a gate connected to a drain of the PMOS transistor 403, and a source connected to the VSS terminal 100. The NMOS transistor 406 has a gate connected to the gate and the drain of the NMOS transistor 405, a drain connected to the first constant current circuit 113, and a source connected to the VSS terminal 100.

Next, the operation of the voltage regulator of FIG. 4 is described. The basic operation of the voltage regulator of FIG. 4 is the same as that of the voltage regulator of FIG. 1.

When a load is suddenly changed from a light load satisfying $Iout<Iact$ to a heavy load satisfying $Iout>Iact$, the first constant current circuit 113 configured to operate the protection circuit 203 is activated from a stopped state. However, there is delay time of activation of the first constant current circuit 113. In view of this, the boost circuit 400 is used to quickly start the operation of the first constant current circuit 113, to thereby shorten delay time of activation of the protection circuit 203.

The boost circuit 400 detects, with the high-pass filter, that a load is suddenly changed to a heavy load based on an output signal of the error amplifier 102. Then, current is temporarily caused to flow through a current path connected in parallel to the first constant current circuit 113, to thereby increase the operation speed of the protection circuit 203. In short, the delay time of the activation of the protection circuit 203 can be shortened.

Note that, in the above description, the boost circuit 400 detects that a load is suddenly changed to a heavy load based on the output signal of the error amplifier 102, but the boost circuit 400 is not limited to this configuration as long as the boost circuit 400 can detect that a load is suddenly changed to a heavy load.

Further, when the first constant current circuit 113 is connected to the VDD terminal 109, the drain of the PMOS transistor 403 may be connected directly to the first constant current circuit 113, and the current mirror circuit 404 is unnecessary in this case.

As described above, the protection circuit 203 of the voltage regulator of the present invention is configured to control, when a state that requires the protection is detected, the output transistor 106 so as not to be completely off. Thus, the erroneous operation in which the protection circuit 203 is repeatedly operated and stopped is avoided, and a time period required for activating the protection circuit 203 can be shortened.

Note that, the boost circuit 400 that is added to the circuit of FIG. 1 is described, but a similar effect is obtained even when the boost circuit 400 is added to the circuit of FIG. 2 or FIG. 3.

What is claimed is:

1. A voltage regulator configured to control an output transistor through error amplification between a reference voltage and a feedback voltage, to thereby output a predetermined output voltage, the voltage regulator comprising:

a protection circuit configured to control the output transistor when an abnormality of the voltage regulator is detected, wherein the protection circuit comprises:

a detection unit configured to detect the abnormality of the voltage regulator; and a first transistor and a second transistor connected in series between a gate of the output transistor and a source of the output transistor, and wherein when the second transistor is turned on based on an output of the detection unit, a gate-source voltage of the output transistor remains by a drain-source voltage of the first transistor;

a first constant current circuit configured to supply operating current to the protection circuit; and a detection circuit configured to detect output current flowing through the output transistor, to thereby control the first constant current circuit, the detection circuit being further configured to detect the output current with a predetermined reference current value, the protection circuit being further configured to control the output transistor so that the output current does not fall below the predetermined reference current value.

2. The voltage regulator according to claim 1, wherein the detection circuit comprises:

a third transistor and a second constant current circuit connected in series between a source of the output transistor and a VSS terminal;

a fourth transistor connected in parallel to the third transistor; and a switch, wherein the predetermined reference current value comprises: a first reference current value when the output current is changed from a small value to a large value; and a second reference current value when the output current is changed from a large value to a small value, the switch being controlled so that the second reference current value is smaller than the first reference current value.

3. The voltage regulator according to claim 1, wherein the detection circuit comprises:

a third transistor and a second constant current circuit connected in series between a source of the output transistor and a VSS terminal;

a third constant current circuit connected in parallel to the second constant current circuit; and a switch, wherein the predetermined reference current value comprises: a first reference current value when the output current is changed from a small value to a large value; and a second reference current value when the output current is changed from a large value to a small value, the switch being controlled so that the second reference current value is smaller than the first reference current value.

4. The voltage regulator according to claim 1, further comprising a boost circuit configured to detect that a load is suddenly changed to a heavy load, and to increase the operating current of the protection circuit based on the detection of the sudden change.

* * * * *